(12) United States Patent
Sojourner

(10) Patent No.: US 6,473,092 B1
(45) Date of Patent: Oct. 29, 2002

(54) APPARATUS AND METHOD FOR COLOR ILLUMINATION IN DISPLAY DEVICES

(75) Inventor: Douglas Sojourner, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/545,573

(22) Filed: Apr. 7, 2000

(51) Int. Cl.[7] .............................. G09G 5/02; G09G 3/36; G09G 3/34
(52) U.S. Cl. ........................... 345/589; 345/88; 345/84; 345/697
(58) Field of Search .................. 345/7, 88, 591, 345/83, 102, 697, 593, 589

(56) References Cited

U.S. PATENT DOCUMENTS

| | | | | |
|---|---|---|---|---|
| 4,772,885 A | * | 9/1988 | Uehara et al. .............. 345/102 |
| 5,153,568 A | * | 10/1992 | Shaw .......................... 345/589 |
| 5,191,450 A | * | 3/1993 | Yajima et al. ................ 345/88 |
| 5,287,096 A | * | 2/1994 | Thompson et al. ......... 345/697 |
| 5,668,611 A | * | 9/1997 | Ernstoff et al. ............. 345/697 |
| 5,682,180 A | * | 10/1997 | Young et al. ................. 345/22 |
| 5,737,038 A | * | 4/1998 | Gale et al. .................... 345/84 |
| 5,760,850 A | * | 6/1998 | Nakanishi et al. .......... 349/106 |
| 5,784,038 A | * | 7/1998 | Irwin .......................... 345/32 |
| 5,821,911 A | * | 10/1998 | Jachimowicz ................ 345/32 |
| 5,909,204 A | * | 6/1999 | Gale et al. .................... 345/589 |
| 6,023,253 A | * | 2/2000 | Taniguchi et al. ............ 345/7 |
| 6,072,458 A | * | 6/2000 | Asakawa et al. ........... 345/101 |
| 6,097,367 A | * | 8/2000 | Kuriwaki et al. ........... 345/589 |
| 6,232,947 B1 | * | 5/2001 | Miyawaki et al. .......... 345/100 |
| 6,271,895 B2 | * | 8/2001 | Takagi et al. .................. 345/7 |
| 6,281,867 B2 | * | 8/2001 | Kurematsu et al. ......... 345/589 |
| 6,331,879 B1 | * | 12/2001 | Sawai et al. .................. 349/9 |
| 6,377,236 B1 | * | 4/2002 | Karamoto .................... 345/102 |
| 6,424,327 B2 | * | 7/2002 | Havel .......................... 324/115 |

* cited by examiner

*Primary Examiner*—Matthew Luu
*Assistant Examiner*—Ryan Yang (57) ABSTRACT

A color display device and a method is provided that renders images in a way optimized for perception by the human visual system, improving image color quality, and reducing device complexity are provided. The display device uses only two phases of illumination. This results in a reduction in sequential color artifact, cost and device complexity. A first illuminant source is optically coupled to a pixel and is adapted to provide a first color component on a first dual-color axis with a first duration. A second illuminant source is also optically coupled to the pixel and is adapted to provide a second color component on a second dual-color axis with a second duration. The first and the second color components are combined to illuminate the pixel with the first and second colors of the respective first and second durations whereby the pixel is perceived to be illuminated by a single color of a single intensity.

25 Claims, 4 Drawing Sheets

APPARATUS AND METHOD FOR COLOR ILLUMINATION IN DISPLAY DEVICES

TECHNICAL FIELD

The present invention relates generally to video and graphics display devices, and more particularly to the illumination of display devices.

BACKGROUND

Display devices are commonly used in televisions or computer monitors for displaying color pictures or information. One type of display is "self-luminant", i.e., one which generates light required for its operation, such as a cathode ray tube (CRT). For example, televisions and CRT computer monitors are self-luminant because there are phosphors on the screens which actually glow and emit light. Another type of display is "non-self-luminant", i.e., one which requires an external source to supply the light required for its operation. For example, slide projectors are non-self-luminant because they have projection lamps that shine light through the display image (the slide) and onto a screen which simply reflects the light. Non-self-luminant displays are classified into reflective and transmissive types. In a reflective display, external light is reflected off a surface of the display to produce an image. In a transmissive display, the external light is allowed to pass through the display to produce the image.

Recently, display devices based on electro-optical materials such as ferro-electric liquid crystals have been introduced. Such display devices can form part of a miniature, wearable display, sometimes called an eyeglass display or a microdisplay, and also can form part of a front- or rear-projection display. The liquid crystal material, which forms the optical component of the display device, is placed directly on top of a silicon integrated circuit, which is divided into a two-dimensional array of picture elements (pixels) that define the pixels of the display device. The signals used to turn the individual pixels of the display device on and off are generated on the silicon integrated circuit.

The display device typically includes a reflective light valve, an illuminant source which generates light that illuminates the light valve, and output optics that focus the light to form an image. The light valve is composed of a reflective spatial light modulator, a polarizer, a beam splitter and an analyzer. In operation, light generated by the illuminant source passes through the polarizer. The polarizer polarizes the light output from the illuminant source. The beam splitter reflects a fraction of the polarized light output from the polarizer towards the spatial light modulator. The spatial light modulator is divided into a two-dimensional array of picture elements (pixels) that define the pixels of the display device. The spatial light modulator will reflect the light in a manner such that the plane of polarization of the light will or will not be rotated. The beam splitter transmits a fraction of the light reflected by the spatial light modulator to the analyzer. Light is output to the output optics from the light valve which causes the pixels to appear bright or dark depending on whether or not its direction of (polarization was rotated by the spatial light modulator.)

In all the above systems, there are three conventional methods of rendering color images in a display device. The three methods render a color image using the conventional red-green-blue (RGB) system. The first method involves using three separate pixels that are spatially located near each other. Each of the pixels represents one of the primary colors: red, green and blue.

The second method involves using three separate spatial light modulators. Each spatial light modulator modulates light of one of the three primary colors. The light from the spatial light modulators is then projected onto a screen or bought together in some way to make a color image.

The third method involves using a spatial light modulator that sequentially displays red, blue, and green images. In this method, the spatial light modulator is illuminated with red, green and blue light in sequence.

Each of these methods has its disadvantages. In the first method, three pixels are used to represent a pixel of the image. Since the pixels are spread out spatially, the image pixel may appear blurred, as the red, green and blue colors are not in the same location. The blurring effect is particularly noticeable in the form of a color fringe seen at the edge of a colored region.

In the second method, precise alignment of the optics is required to ensure that the light from each of the three spatial light modulators is combined uniformly. While satisfactory alignment may be achieved in the center portions of the image, good alignment is difficult to achieve at the edge of the image. It is found that image pixels located near the edges are spread out into individual colors leading to poor image color quality.

The third method has a problem which is commonly referred to as sequential color artifact. One way to understand this is to imagine a black screen that displays a white vertical bar. An observer who is looking at this display would have an image of the white bar fall on the observer's retina. However, when the observer's eye moves quickly to look at something else, the white bar image will appear to smear across the retina. Since the bar is at a different color at a different time, it is not white at any one time. So what the observer's retina perceives is a red stripe, followed by a green stripe, and followed by a blue stripe. As a result, the white bar appears to look like overlapping colored bars. This is called a sequential color artifact because the colors are observed in sequence.

One other significant drawback of the RGB color display devices is that color information required for a color display device (for example, 3×8 or 24 bits of data for a color computer monitor) is not optimized for bandwidth relative to the sensitivities of the human eye but is equally weighted.

When an observer looks at a spot on a color display, three pieces of information go to the observer's brain. The first piece of information is how bright the spot is, regardless of its color. The brightness is called luminance. The second piece of information is whether the color is more red or more cyan. This is called red-cyan chrominance. The third piece of information is whether the color is more yellow or more blue. This is called yellow-blue chrominance. The human visual processing system is focused on these three pieces of information, rather than the attributes of red, green and blue as used in the conventional RGB system. Because a human visual system is limited in how much information it can process, it makes approximations based on luminance, red-cyan chrominance, and yellow-blue chrominance. For example more luminance information is retained by the human visual system than chrominance information. To achieve adequate luminance information, more R, G, and B information is required than is necessary for adequate red-cyan or yellow-blue chrominance. As a result, an RGB system is forced to transmit and store excessive chrominance information, or insufficient luminance information, so the quality of color images rendered by the conventional methods is not optimized.

Accordingly, there has long been a need for a color display device that renders images in a way optimized for perception by the human visual system, which improves image color quality and reduces device complexity.

DISCLOSURE OF THE INVENTION

The present invention provides a method of illuminating a pixel on a color display device. A first illuminant source is optically coupled to the modulator pixel which modulates the illuminant source to provide a first color component on a first dual-color axis with a first duration. A second illuminant source is also optically coupled to the modulator pixel which modulates the second illuminant source to provide a second color component on a second dual-color axis with a second duration. The modulated first and the second color components are combined to illuminate the display pixel with the first and second colors of the respective first and second durations whereby the display pixel is perceived to be illuminated by a single color of a single color and intensity. The method renders images in a way optimized for perception by the human visual system. This allows improved image color quality and a reduction in device complexity.

The present invention further provides a method of illuminating a pixel on a color display device. A first illuminant source is optically coupled to the modulator pixel which modulates the illuminant source to provide a first color component having a red/cyan chrominance value and a first luminance value. A second illuminant source is also optically coupled to the modulator pixel which modulates the second illuminant source to provide a second color component having a yellow/blue chrominance value and a second luminance value. The modulated first and the second color components are combined to illuminate the display pixel with the red/cyan and yellow/blue chrominance value colors of the respective first and second luminance values whereby the display pixel is perceived to be illuminated by a single color of a single intensity. The method renders images in a way optimized for perception by the human visual system. This allows improved image color quality and a reduction in device complexity.

The present invention further provides a color display device for displaying a pixel. A first illuminant source is optically coupled to the modulator pixel which modulates the illuminant source to provide a first color component on a first dual-color axis with a first duration. A second illuminant source is optically coupled to the modulator pixel which modulates the second illuminant source to provide a second color component on a second dual-color axis with a second duration. Color component circuitry is connected to the first and second illuminant sources and the pixel for controlling the combination of the first and second color components. The modulated first and the second color components in combination illuminate the display pixel with the first and second colors of the respective first and second durations whereby the display pixel is perceived to be illuminated by a single color of a single intensity. The method renders images in a way optimized for perception by the human visual system. This allows improved image color quality and a reduction in device complexity.

The present invention further provides a color display device for displaying a pixel. A first illuminant source is optically coupled to the modulator pixel which modulates the illuminant source to provide a first color component having a red/cyan chrominance value with a first luminance value. A second illuminant source is optically coupled to the modulator pixel which modulates the second illuminant source to provide a second color component having a yellow/blue chrominance value with a second luminance value. Color component circuitry is connected to the first and second illuminant sources and the pixel for controlling the combination of the first and second color components. The modulated first and the second color components in combination illuminate the display pixel with the red/cyan and yellow/blue colors of the respective first and second luminance values whereby the display pixel is perceived to be illuminated by a single color of a single intensity. The method renders images in a way optimized for perception by the human visual system. This allows improved image color quality and a reduction in device complexity.

The above and additional advantages of the present invention will become apparent to those skilled in the art from a reading of the following detailed description when taken in conjunction with the accompanying drawings.

BEST MODE FOR CARRYING OUT THE INVENTION

Structure

When two color components are combined, the human eye integrates them into a single color. The present invention makes use of this and uses an L*u*v* model to render color images on a color display device. L* represents luminance, and u* and v* are the red-cyan chrominance and the yellow-blue chrominance, respectively. The u* and v* are regarded as defining the coordinates of chrominance in a two-dimensional space. For example, the u* value defines a color component with coordinate u* along a red-cyan axis, and the v* value defines a color component with a coordinate v* along a yellow-blue axis. The L*u*v* model closely resembles the perception of the human visual system.

Where data is originally rendered in red-green-blue (RGB) format, the data may be converted to the CIELUV format (which uses the variables L*, u*, and v*) of the present invention using Equations 1–7 (note that any coordinate system can be used provided that colors for the illuminants are properly chosen. This coordinate system corresponds fairly well with the u* axis representing red/cyan and the v* axis representing yellow/blue). These equations are widely understood, and can, for example, be found in *Measuring Colour*, by Dr. R. W. G. Hunt, pages 45, 61, and 63.

$X=0.049R+0.31G+0.20B$ $Y=0.17697R+0.81240G+0.01063B$ $Z=0.00R+0.01G+0.99B$ $u'=4X/(X+15Y+3Z)$ $v'=9Y/(X+15Y+3Z)$ $L^*=116(Y/Y_n)^{1/3}-16$ if $Y/Y_n>0.008856$ or $L^*=903.3(Y/Y_n)$ if $Y/Y_n \leq 0.008856$ (Where $Y_n$ is the Y value of the white point)

u*=13L*(u'−u$_n$') (Where u$_n$' is the u' value of the white point)

v*=13L*(v'−v$_n$') (Where v$_n$' is the v' value of the white point) (Equations 1–7)

Figure 1:
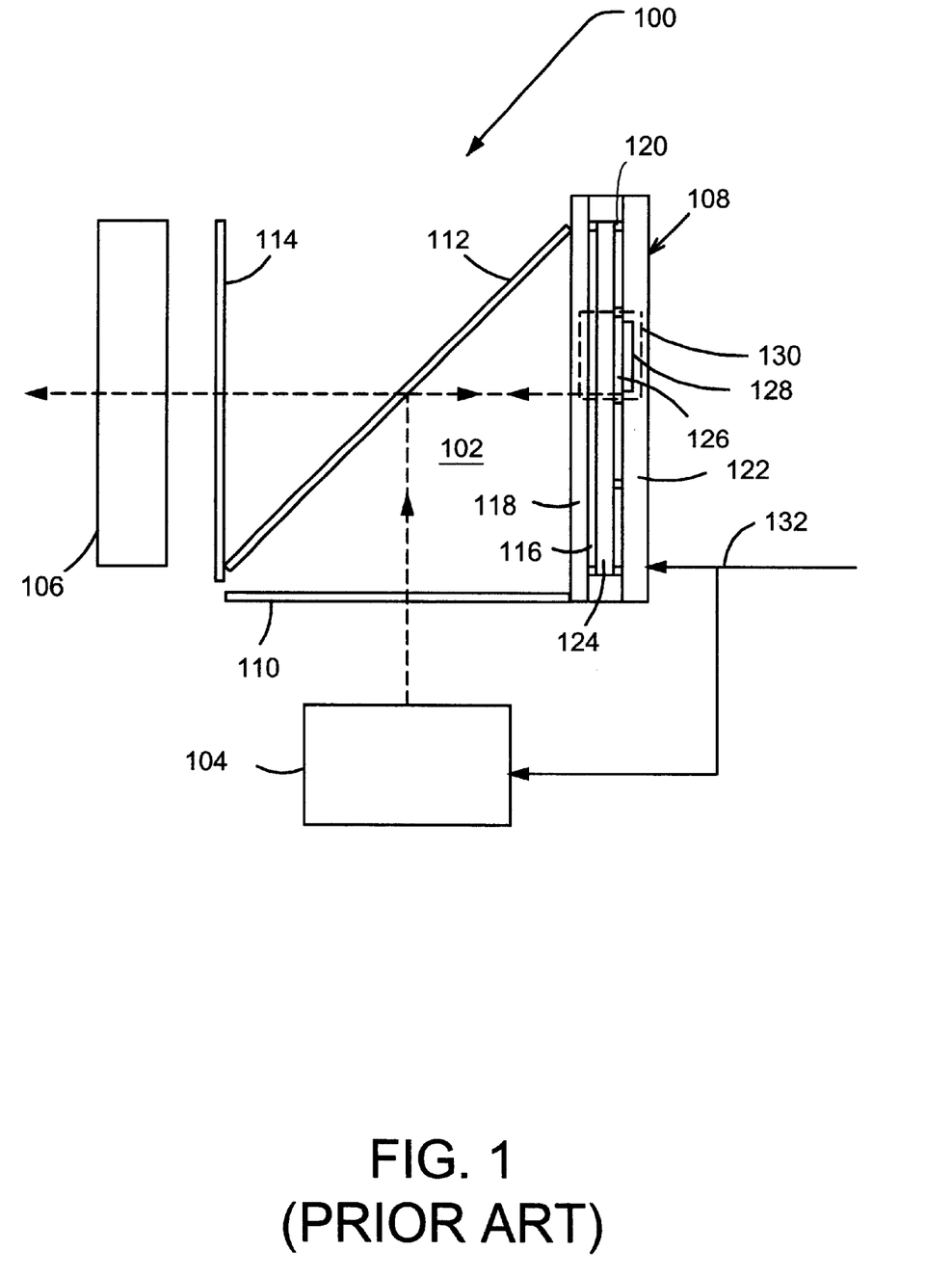
FIG. 1 (PRIOR ART) is a schematic of a conventional display device.

Referring now to FIG. 1 (PRIOR ART), therein is shown an example of a display device 100. The display device 100 is composed of a reflective light valve 102, an illuminant source 104, which generates light that illuminates the light valve 102, and output optics 106 that focus the light to form an image (not shown). The light valve 102 is composed of a reflective spatial light modulator 108, a polarizer 110, a beam splitter 112 and an analyzer 114. The display device 100 shown may form part of a miniature wearable display, a projection display, or other various types of displays.

In the display device 100, light generated by the illuminant source 104 passes through polarizer 110. The polarizer 110 polarizes the light output from the illuminant source 104. The beam splitter 112 reflects a fraction of the polarized light output from the polarizer 110 towards spatial light modulator 108. The spatial light modulator 108 is divided into a two-dimensional array of picture elements (pixels) that define the pixels (display pixels) of the display device. The beam splitter 112 transmits a fraction of the light reflected by the spatial light modulator to the analyzer 114.

The direction of an electric field in each pixel of the spatial light modulator 108 determines whether or not the direction of polarization of the light reflected by the pixel is rotated by 90° relative to the direction of polarization of the incident light. The light reflected by each pixel of the spatial light modulator 108 passes through beam splitter 112 and analyzer 114 and is output from the light valve 102 depending on whether or not its direction of polarization was rotated by the spatial light modulator 108. The light output from the light valve 102 passes to the output optics 106.

The illuminant source 104 may be composed of light-emitting diodes (LEDs).

The LEDs are of three different colors in a color display. Other light-emitting devices whose output can be rapidly modulated may alternatively be used as the illuminant source 104. As a further alternative, a white illuminant source and a light modulator (not shown) may be used. The light modulator modulates the amplitude of the light generated by the illuminant source to define the illumination period and balance period of the spatial light modulator 108. In a light valve for use in a color display device, the light modulator additionally modulates the color of the light output from the illuminant source.

The polarizer 110 polarizes the light generated by the illuminant source 104. The polarization is preferably linear polarization. The beam splitter 112 reflects the polarized light output from the polarizer 110 towards spatial light modulator 108, and transmits the polarized light reflected by the spatial light modulator to analyzer 114. The direction of maximum transmission of the analyzer is orthogonal to that of the polarizer in this example.

The spatial light modulator 108 is composed of a transparent electrode 116 deposited on the surface of a transparent cover 118, a reflective electrode 120 located on the surface of a semiconductor substrate 122, and a layer 124 of an electro-optical material, such as a liquid crystal, sandwiched between the transparent electrode 116 and the reflective electrode 120. The reflective electrode 120 is divided into a two-dimensional array of pixel electrodes that define the pixels of the spatial light modulator 108 and of the light valve 102. A substantially reduced number of pixel electrodes are shown to simplify the drawing. For example, in a light valve 102 for use in a large-screen computer monitor, the reflective electrode could be divided into a two-dimensional array of 1600×1200 pixel electrodes. An exemplary pixel electrode is shown at 126. Each pixel electrode reflects the portion of the incident polarized light that falls on it towards the beam splitter 112.

A pixel drive circuit applies a pixel drive signal to the pixel electrode of each pixel of the spatial light modulator 108. A pixel drive circuit 128 of an exemplary pixel 130 is shown in FIG. 1 (PRIOR ART) as being located in the semiconductor substrate 122. The pixel drive signal alternates between two different voltage levels, a high state and a low state. When liquid crystal is used as the electro-optical material layer 124, the transparent electrode 116 is maintained at a fixed potential mid-way between the voltage levels of the pixel drive signal. The potential difference between the pixel electrode 126 and the transparent electrode 116 establishes an electric field across the part of the liquid crystal layer 124 between the pixel and the transparent electrode 116. The direction of the electric field determines whether the liquid crystal layer 124 rotates the direction of polarization of the light reflected by the pixel electrode 126, or leaves the direction of polarization unchanged.

When the display device 100 forms part of a miniature, wearable display, the output optics 106 are composed of an eyepiece that receives the light reflected by the reflective electrode 120 and forms a virtual image at a predetermined distance in front of the viewer (not shown). In a cathode-ray tube replacement or in a projection display, the output optics are composed of projection optics that focus an image of the reflective electrode 120 on a transmissive or reflective screen (not shown). Optical arrangements suitable for use as an eyepiece or projection optics are well known in the art and will not be described here.

Since the direction of maximum transmission of the analyzer 114 is orthogonal to the direction of polarization defined by the polarizer 110, light whose direction of polarization has been rotated through 90° by a pixel of the spatial light modulator 108 will pass through the analyzer and be output from the light valve 102 whereas light whose direction of polarization has not been rotated will not pass through the analyzer 114. The analyzer 114 only transmits to output optics 106 light whose direction of polarization has been rotated by pixels of the spatial light modulator 108. The direction of the electric field applied to each pixel of the spatial light modulator 108 determines whether the corresponding display pixel will appear bright or dark. When a display pixel appears bright, it will be said to be ON, and when the display pixel appears dark, it will be said to be OFF.

The pixel drive circuit of each pixel of the spatial light modulator 108 determines the duration of the ON state of the corresponding display pixel in response to a portion of an input video signal 132 corresponding to the location of the pixel in the spatial light modulator 108.

The direction of maximum transmission of the analyzer 114 can alternatively be arranged parallel to that of the polarizer 110, and a non-polarizing beam splitter can be used as the beam splitter 112. In this case, the spatial light modulator 108 operates in the opposite sense to that just described.

Figure 2:
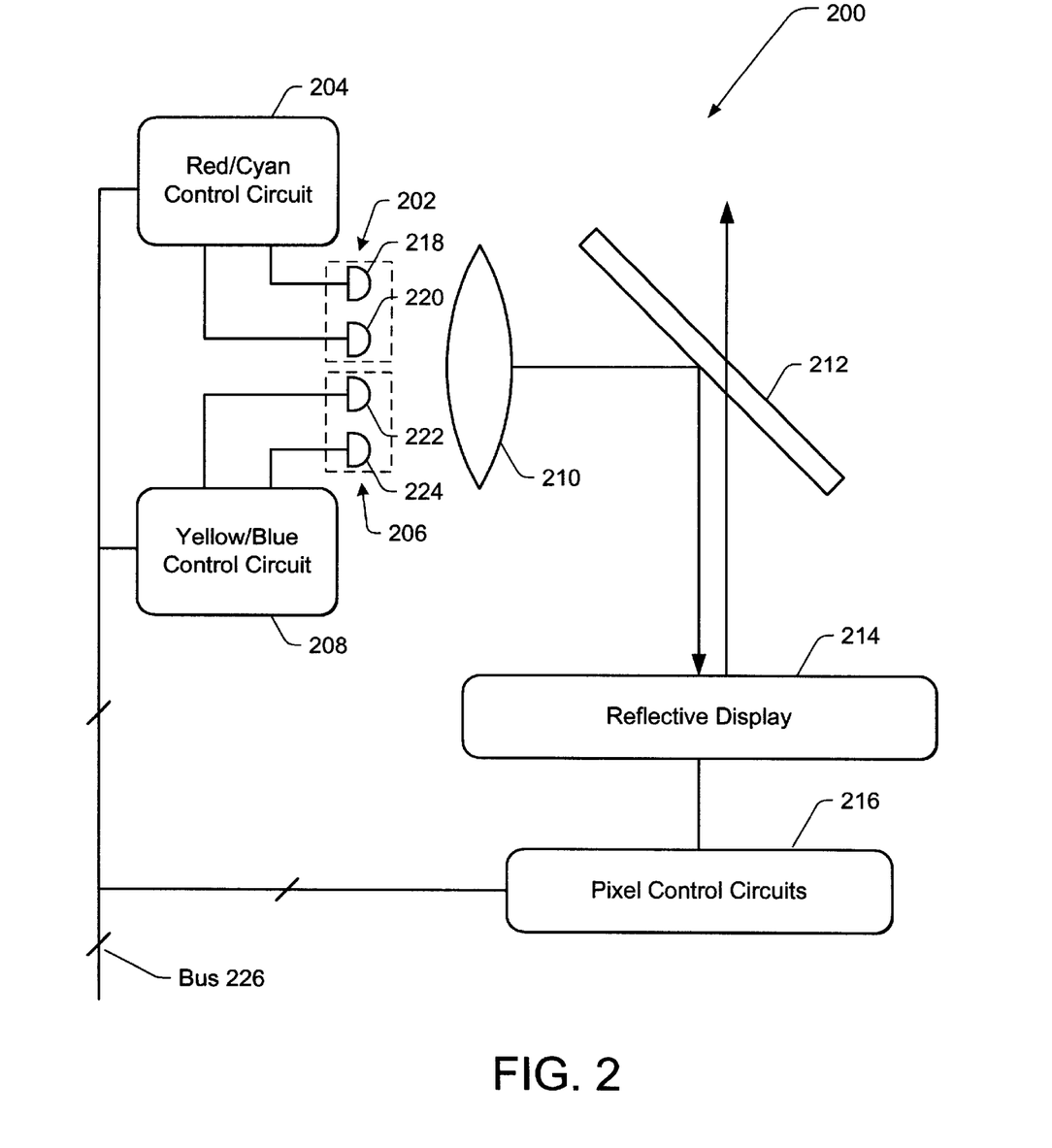
FIG. 2 is a schematic of a color display device of the present invention.

Referring now to FIG. 2, therein is shown a reflective color display device 200 constructed in accordance with the present invention. The color display device 200 includes a first illuminant source 202, a red/cyan component control circuit 204 coupled to the first illuminant source 202, a second illuminant source 206, a yellow/blue component control circuit 208 coupled to the second illuminant source 206, an optical system 210, a beam splitter/polarizer 212, a reflective display 214 which includes a plurality of pixels (not shown), and a plurality of pixel control circuits 216 coupled to the reflective display 214.

Each of the plurality of pixel control circuits 216, designated both singularly and in the plurality by the numeral 216, is coupled to a corresponding one of the pixels in the reflective display 214. It should be noted that the red/cyan component control circuit 204 and the yellow/blue component control circuit 208 may be co-located on a silicon substrate in a microdisplay and may be substantially identical in structure.

In the preferred embodiment, the first illuminant source 202 includes a red light-emitting diode (LED) 218 and a cyan LED 220, and the second illuminant source 206 includes a yellow LED 222 and a blue LED 224. The first illuminant source 202 and the second illuminant source 206 are coupled to the plurality of pixels through the optical system 210, the beam splitter/polarizer 212 and the reflective display 214. The red/cyan component control circuit 204, the yellow/blue component control circuit 208, and the pixel control circuit 216 are coupled to a bus 226. The configuration and functions of the bus 226 will be described later.

The red/cyan component control circuit 204 is an illumination control circuit that controls the perceived color and intensity of the light from first illuminant source 202 as a function of time by varying the current going to the red and cyan LEDs 218 and 220. Similarly, the yellow/blue component control circuit 208 controls the perceived color and intensity of the light from the second illuminant source 206 as a function of time by varying the current going to the yellow and blue LEDs 222 and 224. The red/cyan component control circuit 204 and the yellow/blue component control circuit 208 provide a sequentially operated display by causing the LEDs to alternately illuminate the display with red/cyan color and yellow/blue color.

Figure 3:
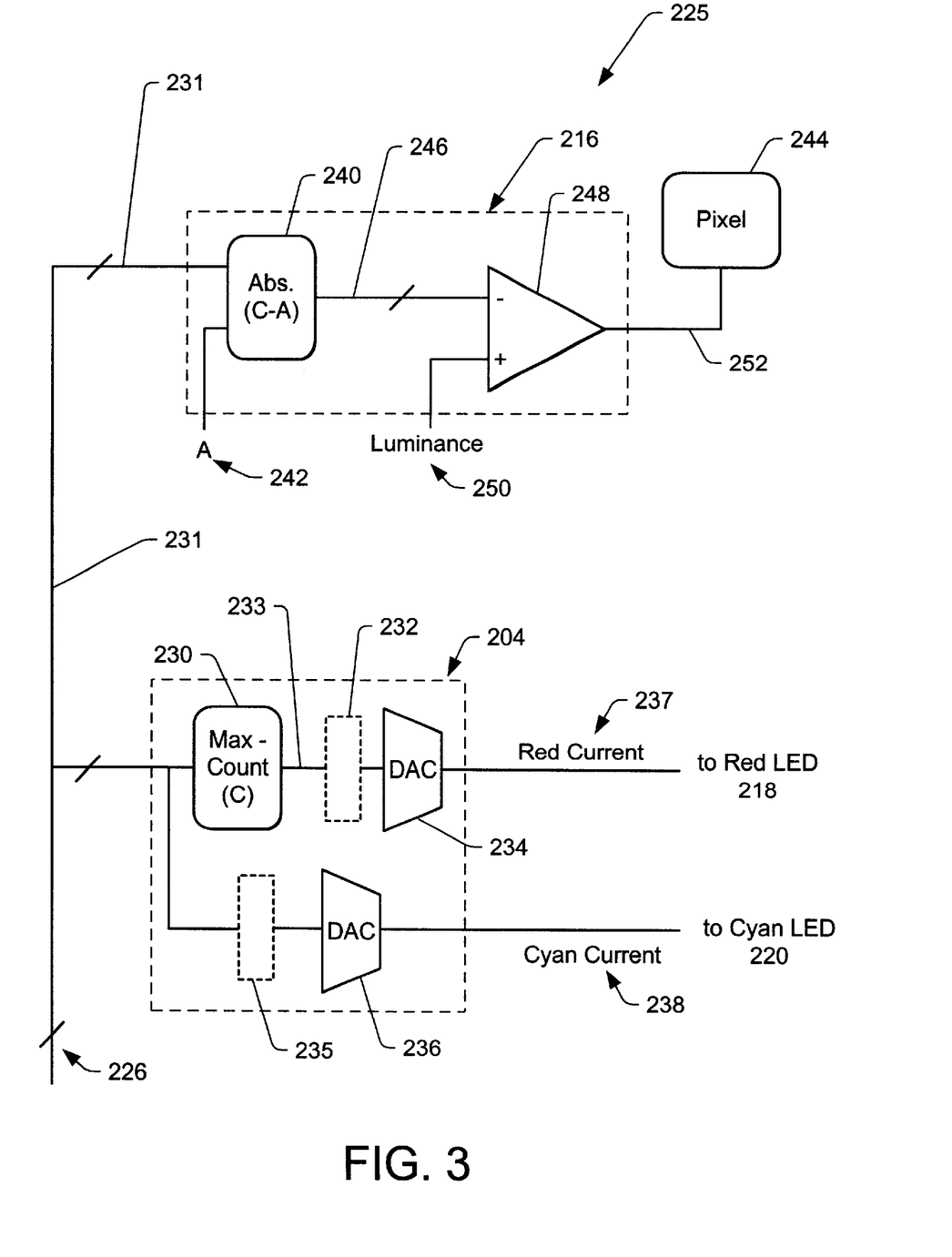
FIG. 3 is a schematic of a color component circuitry of the present invention.

Referring now to FIG. 3, therein is shown a schematic of color component circuitry 225 which includes the red/cyan component control circuit 204 and an exemplary one of the pixel control circuits 216 of the color display device 200 according to the present invention. The red/cyan component control circuit 204 would be duplicated (or time multiplexed) for each color source; e.g., the yellow/blue component control circuit 208 would be a duplicate of the red/cyan component control circuit 204. The pixel control circuit 216 would be duplicated (or time multiplexed) for each pixel.

The bus 226 is connected to the red/cyan component control circuit 204 and the pixel control circuit 216. A globally generated and distributed "count" signal (C) 231 is provided on the bus 226.

The red/cyan component control circuit 204 includes a subtracter 230, an optional first look up table 232, a first digital-to-analog converter (DAC) 234, an optional second look up table 235, and a second DAC 236. It should be noted that the first look up table 232 and the second look up table 235 are optional and are therefore shown by dotted lines.

In the red/cyan control circuit, the subtracter 230 is connected to the bus 226 and generates a minus count signal (−C) 233 that counts down linearly from a predetermined maximum as the count signal (C) 231 counts up to a predetermined maximum. The first digital-to-analog converter (DAC) 234 is coupled directly to the subtracter 230 or indirectly to it through the first look up table 232. The second digital-to-analog converter (DAC) 234 is coupled directly to the bus 226 or indirectly to it through the second look up table 235. The first and second look up tables 232 and 235 map the linear counts to non-linear color transformations for improved correspondence to the responsiveness of the human vision system for red and cyan, respectively.

The count signal (C) 231 is used to synchronize the timing operation of the pixel control circuit 216 with the respective red/cyan component control circuit 204 and yellow/blue component control circuit 208. The exact width of the bus 226 would depend on the precision required. For a very low-cost system, the bus 226 may be a few bits wide and for a very high performance system, the bus 226 may be much wider.

The output of the first DAC 234 is coupled to the red LED 218 for providing a current, designated as "red" current 237, to the red LED 218. The output of the second DAC 236 is coupled to the cyan LED 220 for providing a current, designated as "cyan" current 238, to the cyan LED 220.

As would be evident to those skilled in the art, the yellow/blue component control circuit 208 would be substantially identical to the red/cyan component control circuit 204 with the primary difference being in the optional first and second look up tables which would be different to map the linear counts to non-linear color transformations for improved correspondence to the responsiveness of the human vision system for yellow and blue, respectively. While the linear color transformations for the two chrominance values would be inversely proportional, it is not necessary for the non-linear chrominance values to be proportional.

The pixel control circuit 216 includes an absolute value subtracter 240. The absolute value subtracter 240 has one of its inputs coupled to the count signal (C) 231, and the other of its input coupled to receive an u* value (data) 242 for a pixel 244 during a red/cyan (or u*) display phase. The absolute value subtracter 240 generates a color control signal (C') 246, which is the absolute value (Abs.) of the difference between the count signal (C) 231 and the u* value 242.

It will be understood that the red/cyan (or u*) display phase, which provides a red/cyan color component, and a yellow/blue (or v*) display phase, which provides a yellow/cyan color component, together make up a complete cycle which would be perceived by an observer as a single color.

The pixel control circuit 216 further includes a comparator 248. The comparator 248 has its first input coupled to receive the color control signal (C') 246, and its second input coupled to receive a luminance value (L*) 250. The output of the comparator 248 is a control signal 252 which is a pulse and which is true (or high) as long as the color control signal (C') 246 is less than or equal to the luminance value (L*) 250.

In one embodiment, the comparator 248 has a non-linear response more closely matching the human visual response. The output is high if $C' < L^\gamma$, where $\gamma$ is the "gamma" of the reflective display 214 and has a value which is typically equals to approximately 2. The control signal 252 is coupled to turn the pixel 244 ON and OFF. The width of the pulse is directly proportional to the luminance value (L*) 250, or 7 corrected luminance if $C' < L^\gamma$ (commonly referred to as the "gamma corrected" model) is used, and its location on the time axis is proportional to the chrominance value u*.

Figure 4:
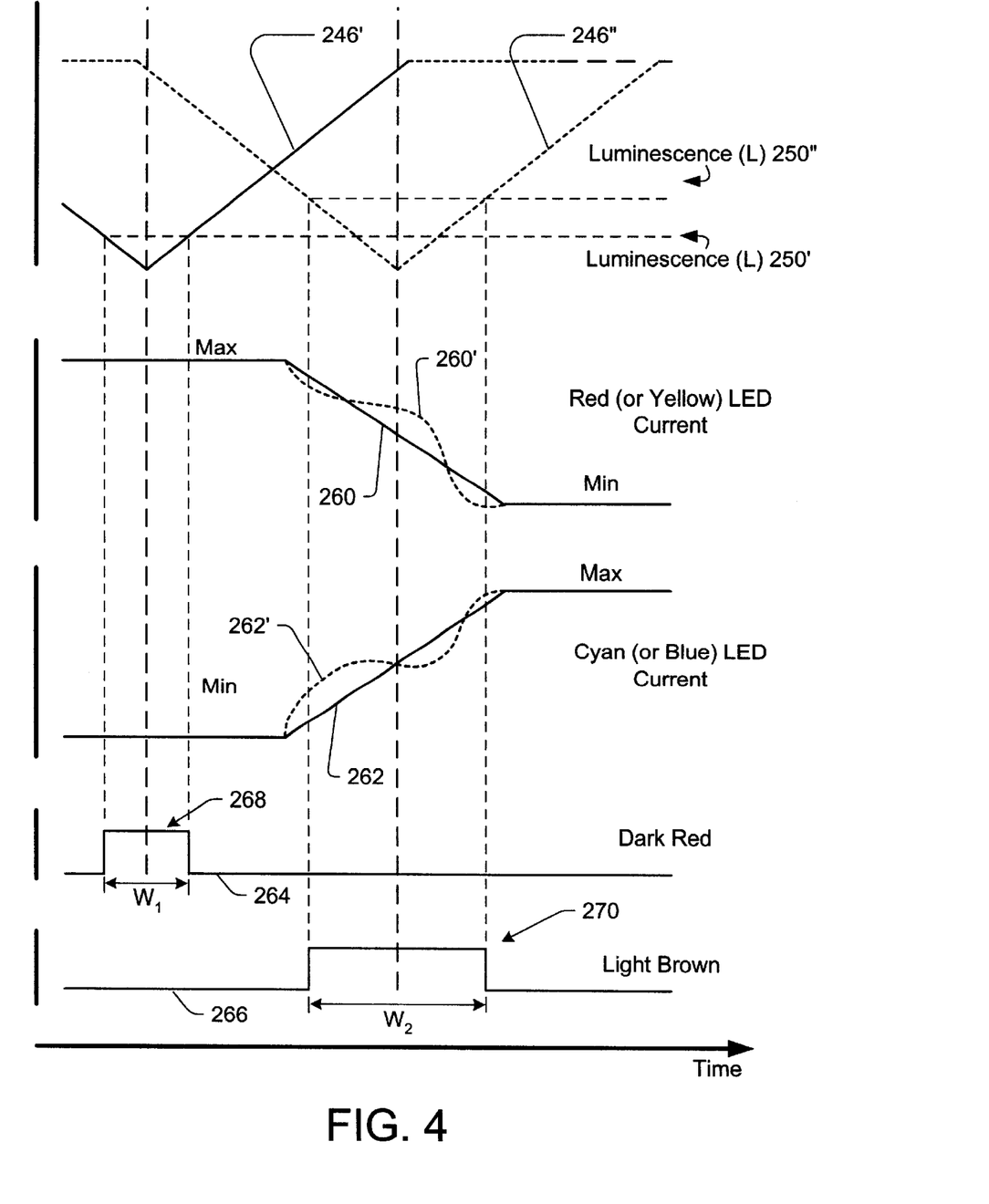
FIG. 4 is a graphical representation of signal levels of the present invention.

Referring now to FIG. 4, in the center thereof are shown a red signal 260, indicating the change in the level of the red current 237 over time, and a cyan signal 262, indicating the change in the level of the cyan current 238 over time. The signals 260 and 262 are also representative of the illumination provided by red and cyan LEDs 218 and 220, respectively. The signals 260' and 262' are representative of the illumination provided by red and cyan LEDs 218 and 220 with non-linear color transformations.

In the upper portion of FIG. 4 are shown a first example where a color control signal (C') 246' has its ON time centered on a time when the red current 237 is high and the cyan current 238 is low. A second example is also given where a color control signal (C") 246' has its ON time centered on a time when the red and cyan currents are both at about the half way level.

Also shown are a first digital timing trace 264 for the first example and a second digital timing trace 266 for the second example, which are examples of two different control signals 252. When the luminance value (L*) 250 is small, the comparator 248 will provide the control signal 252 when the color control signal 246' is close to the ON center time and end the control signal 252 when the color control signal 246' is just past the ON center time. As a result, the trace 264 will have a pulse 268 with a small pulse width of $W_1$. Similarly, when the luminance value (L*) 250 is large, the comparator 248 will provide the control signal 252 when the color control signal 246" is far from the ON center time and end the control signal 252 when the color control signal 246" is past the ON center time as shown by trace 264. As a result, the trace 266 will have a pulse 270 with a large pulse width of $W_2$. The widths $W_1$ and $W_2$ of respective pulses 268 and 270 determine the lengths of time that the pixel 244 is ON. Thus, the location of the center of a pulse relative to the levels of the color signals determines the color of the light that illuminates the pixel when it is ON.

Operation

In operation with reference to FIG. 2, when the red, cyan, yellow, and blue LEDs 218, 220, 222, and 224, respectively, are on, the light is be transmitted through the optical system 210 to the beam splitter/polarizer 212 where it is reflected onto the reflective display 214. The individual pixels on the reflective display 214 selectively reflect light under the control of the corresponding pixel control circuits 216. The light is reflected by the pixels to form an image (not shown). The image is then reflected back through the beam splitter/polarizer 212 so that an observer can view the image.

In operation with reference to FIG. 3, the pixel control circuit 216 receives the count signal (C) 231, the u* value 242, and the luminance value (L*) 250 and uses them to generate the control signal 252 for the pixel 244. The absolute value of the count signal 231 minus the u* value 242 is generated by the absolute value subtracter 240 as the color control signal (C') 246.

In the first example, where it is desired that a dark red color be perceived on the pixel 244 by an observer, an u* value 242 is set such that the ON center time will be during the time when the red current 237 is at maximum as shown in FIG. 4. As the color control signal (C') 246' decreases, it becomes less than the luminance value (L*) 250' and the comparator 248 outputs the control signal 252 to turn the pixel 244 ON. After reaching a minimum, the color control signal (C') 246' increases and it becomes more than the luminance value (L*) 250' and the comparator 248 output causes the control signal 252 to turn the pixel 244 OFF.

Since the pulse 268 occurs during the period of time when only the red LED 218 is ON, the color of the pixel 244 will be pure "red". Also, since the duration of the pulse 268 is short, little light will be reflected so the perceived color of the pixel 244 will be a "dark" red.

In the second example, where it is desired that a light brown color be perceived on the pixel 244 by an observer, an u* value 242 is set such that the ON center time will be during the time when the red current 237 and the cyan current 238 are both at about the half-way level as shown in FIG. 4 and the LED 218 and 220 equally bright. As the color control signal (') 246" decreases, it becomes less than the luminance value (L*) 250" and the comparator 248 outputs the control signal 252 to turn the pixel 244 ON. This will occur much later in time than for the color control signal (C') 246'. After reaching a minimum, the color control signal (C') 246' increases and it becomes more than the luminance value (L*) 250" and the comparator 248 output causes the control signal 252 to turn the pixel 244 OFF.

Since the center of the pulse 270 occurs during the period of time when both the red LED 218 and cyan LED 220 are ON and the intensity of light is about the same, the color of the pixel 244 will be in between red and cyan and be perceived as a "brown". Also, since the duration of the pulse 270 is long, light ranging from mostly red with a little cyan to mostly cyan with a little red will be reflected. This light will be centered around the ON center time so the light will be temporally averaged and the perceived color of the pixel 244 will be a "light" brown. It should be noted that if a "dark" brown were desired, the u* value 242 would be the same so the center time would be the same, but the luminance value (L*) 250" would be lower so the pulse 270 would be shorter so the pixel 244 would be ON for less time.

In another embodiment, the first and second lookup tables 232 and 236 will cause the respective red and cyan currents to respectively decrease and increase non-linearly, as shown by red signal 260' for red current and cyan signal 262' for cyan current, to more closely match the human vision system.

By centering the ON time of the pixel on the point on the time axis defined by the u* value 242, the human vision system will perceive a color component along the red/cyan spectrum. One of the colors between red and cyan will be selected and displayed. In addition, by displaying broader or narrower range of the colors on either side of the color defined by the u* value 242, the image can be made brighter or darker.

Similar operations are performed during the yellow/blue display phase, with the v* value substituted for the u* value 242. In essence, the v* value and the count signal 231 controls the intensity of the blue LED 224 and the v* value and the minus count signal (−C) 233 controls the intensity of the yellow LED 222 to range from a perceived pure yellow to a pure cyan. Similarly, the perceived brightness of the pixel is controlled by the pixel control circuit 216 based on the input from the v* value and the luminance value (L*) 250 to define the perceived lightness or darkness of the yellow/blue color component.

Accordingly, by a gradually shifting colors in the LEDs used to illuminate the pixel 244, and by selecting center times that are representative of the color components to be displayed and durations of illumination that are proportional to luminance values in accordance with the present invention, a color display device can be made which is controlled primarily by two phases of illumination. There are a number of advantages with using only two phases of illumination.

First, as the number of phases reduces from three to two, the sequential color artifacts are reduced since there are only two bands of colors instead of three.

Second, in the case of sequential illumination, a two-phase illumination device can be run at higher frame rate than a three-phase illumination device. Further, there will be less perceived flicker on a sequential display displaying white or gray values, since the luminance of both phases will be equal. In contrast, the blue phase in a RGB system is typically darker.

Third, in the case with spatial separation techniques, only two pixels are needed instead of three. This reduces cost and improves image color quality.

Fourth, in the case of multi-spatial light modulator displays, only two spatial light modulators need to be aligned. This reduces complexity and cost, and improves display performance.

Moreover, since the color display device made in accordance with the present invention functions in a way similar to a human visual system, the quality of color images rendered is optimized. For example, since the human eye is more sensitive to intensity than color, the accuracy in the placement of the ON center time of the pulse (e.g., the pulse 270) is less critical so long as there is more accurate control of the width of the pulse. Accordingly, a more robust color display device can be designed which gives better visual quality and results for a given bandwidth.

While the best mode changes the current delivered to the LEDs to vary the intensity of the light output from the LEDs, it should be understood that a plurality of LEDs of each color type (i.e., red, cyan, yellow, and blue) can also be used and the u* and v* values can be controlled by controlling the number of LEDs that are turned on or off at any given time.

Further, in another embodiment, an optical filter that changes, e.g., by rotation, lateral movement, or electrical modulation can be used to provide a gradual change in color (e.g., from red to cyan).

As would be evident to those skilled in the art, the present invention would be applicable to any display device which includes pixel control circuits for each pixel. This would include, for example, display devices fabricated on a silicon wafer (such as a microdisplay device) and display devices formed with amorphous silicon or polysilicon on a glass substrate (such as an active LCD display device).

Further, while the best mode describes a digital implementation, it should be understood that the present invention can be implemented in analog, using analog ramp signals and analog samples stored in capacitors as the luminance and chrominance component inputs.

While the present invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters set forth herein or shown in the accompanying drawings are to be interpreted in an illustrative and non-limiting sense.

The invention claimed is:

1. A method of illuminating a pixel on a color display device, comprising:
providing a first illuminant source, the first illuminant source optically coupled to the pixel and adapted to provide a first color component on a first dual-color axis, the first color component defining a first color having a first duration; and
providing a second illuminant source, the second illuminant source optically coupled to the pixel and adapted to provide a second color component on a second dual-color axis, the second color component having a second color having a second duration;
combining the first and second color components whereby the first color component and the second color component in combination illuminate the pixel with the first and second colors of the respective first and second durations whereby the pixel is perceived to be illuminated by a single color of a single intensity.

2. The method as claimed in claim 1 wherein:
the combining of the first and second color components is performed sequentially in time whereby the pixel is perceived to be illuminated by the single color.

3. The method as claimed in claim 1 including:
controlling the pixel to have an ON state and an OFF state, and
controlling the pixel to be in the ON state during the first and second durations whereby the pixel is perceived to be of the single color and intensity.

4. The method as claimed in claim 1 wherein:
providing the first illuminant source uses a pair of differently colored lights to define the first dual-color axis; and
providing the second illuminant source uses a pair of differently colored lights to define the second dual-color axis.

5. The method as claimed in claim 4 wherein:
controlling one of the illuminant sources to provide one of the color components by varying the intensity of the one of the pair of differently colored lights.

6. The method as claimed in claim 4 wherein:
controlling one of the illuminant sources by varying the intensity of each of the pair of differently colored lights linearly and in inverse proportion with the other.

7. The method as claimed in claim 4 including:
controlling one of the illuminant sources by varying the intensity of each of the pair of differently colored lights non-linearly and inversely with the other.

8. The method as claimed in claim 4 wherein:
the providing of the first pair of differently colored lights uses red and cyan lights; and
the providing of the second pair of differently colored lights uses yellow and blue lights.

9. The method as claimed in claim 4 wherein:
the providing of the first pair of differently colored lights uses a plurality of red and cyan lights; and
the providing of the second pair of differently colored lights uses a plurality of yellow and blue lights; and including;
controlling the first illuminant source by varying the number of the plurality of red and cyan lights ON simultaneously; and
controlling the second illuminant source by varying the number of the plurality of yellow and blue lights ON simultaneously.

10. The method as claimed in claim 1 wherein:
the providing of the first illuminant source uses a first optical filter that changes for providing a gradual change in color of the first color.

11. The method as claimed in claim 1 including:
defining the first and second color components by respective first and second chrominance values; and
defining the first and second color components and the respective first and second durations thereof by respective first and second luminance values.

12. A color display device for displaying a pixel, comprising:
a first illuminant source, the first illuminant source optically coupled to the pixel and adapted to provide a first color component on a first dual-color axis, the first color component defining a first color having a first duration; and a second illuminant source, the second illuminant source optically coupled to the pixel and adapted to provide a second color component on a second dual-color axis, the second color component defining a second color having a second duration;

color component circuitry connected to the first and second illuminant sources and the pixel for controlling the combination of the first and second color components whereby the first and the second color components in combination illuminate the pixel with the first and second colors of the respective first and second durations whereby the pixel is perceived to be illuminated by a single color of a single intensity.

13. The color display device as claimed in claim 12 wherein:

the color component circuitry combines the first and second color components sequentially in time whereby the pixel is perceived to have the single color.

14. The color display device as claimed in claim 12 wherein:

the color component circuitry includes pixel control circuitry for controlling the pixel to have an ON state and an OFF state, and the pixel control circuitry controls the pixel to be in the ON state during the first and second durations whereby the pixel is perceived to be of the single color and intensity.

15. The color display device as claimed in claim 12 wherein:

the first illuminant source uses a pair of differently colored lights to define the first dual-color axis; and the second illuminant source uses a pair of differently colored lights to define the second dual-color axis.

16. The color display device as claimed in claim 15 wherein:

the color component circuitry includes a color component control circuit for controlling the intensity of the pair of differently colored lights, and the color component control circuit controls one of the illuminant sources to provide one of the color components by varying the intensity of the one of the pair of differently colored lights.

17. The color display device as claimed in claim 15 wherein:

the color component circuitry includes a color component control circuit for controlling the intensity of the pair of differently colored lights, and the color component control circuit controls one of the illuminant sources by varying the intensity of each of the pair of differently colored lights linearly and in inverse proportion with the other.

18. The color display device as claimed in claim 15 including:

the color component circuitry includes a color component control circuit for controlling the intensity of the pair of differently colored lights, and the color component control circuit controls one of the illuminant sources by varying the intensity of each of the pair of differently colored lights non-linearly and inversely with the other.

19. The color display device as claimed in claim 15 wherein:

the first illuminant source uses red and cyan lights; and
the second illuminant source uses yellow and blue lights.

20. The color display device as claimed in claim 15 wherein:

the first illuminant source uses a plurality of red and cyan lights; and the second illuminant source uses a plurality of yellow and blue lights; and including:

the color component circuitry includes a color component control circuit for controlling the intensity of the pair of differently colored lights, and the color component control circuit controlling the first illuminant source by varying the number of the plurality of red and cyan lights on simultaneously; and the color component circuitry includes a color component control circuit for controlling the intensity of the pair of differently colored lights, and the color component control circuit controlling the second illuminant source by varying the number of the plurality of yellow and blue lights on simultaneously.

21. The color display device as claimed in claim 12 wherein:

the first illuminant source uses a first optical filter that changes for providing a gradual change in color of the first color; and the second illuminant source uses a second optical filter that changes for providing a gradual change in color of the second color.

22. The color display device as claimed in claim 12 including:

the color component circuitry defining the first and second color components by respective first and second chrominance values; and the color component circuitry defining the first and second color components and the respective first and second durations thereof by respective first and second luminance values.

23. The color display device as claimed in claim 12 wherein the color component circuitry includes a color component control circuit having:

a first digital-to-analog converter adapted to receive a count signal and to generate an output for changing the intensity of a portion of the color component of one of the illuminant sources in proportion to the count signal;

a subtracter adapted to receive the count signal and to generate an inverse count signal;

a second digital-to-analog converter coupled to the first subtracter, the second digital-to-analog converter adapted to receive the inverse count signal and to generate and output for changing the intensity of the remaining portion of the color component of the one of the illuminant sources in proportion to the inverse count signal.

24. The color display device as claimed in claim 23 wherein the color component control circuit includes:

a first look up table connected to the first digital-to-analog converter adapted to receive the count signal and to generate a non-linear output signal as the count signal to the first digital-to-analog converter; and a second look up table disposed between the subtracter and the second digital-to-analog converter adapted to receive the inverse count signal and to generate a non-linear inverse output signal as the inverse count signal to the second digital-to-analog converter.

25. The color display device as claimed in claim 12 wherein the color component circuitry includes a pixel control circuit having:

an absolute value subtracter adapted to receive a count signal and a color signal proportional to the color of one of the color components, the absolute value subtracter responsive to the count signal and the color signal to generate a V-shaped signal, the V-shaped signal having a minimum on the dual-color axis of the one of the color components; and a comparator adapted to receive the V-shaped signal and a luminescence signal proportional to an intensity of the one of the color components, the comparator responsive to the V-shaped signal and the luminescence signal to generate an ON duration signal for the pixel, the ON duration signal is proportional to the intensity of the color of the one of the color components.

* * * * *